July 11, 1933.  C. E. STARR  1,918,063
VEHICLE TESTING APPARATUS
Filed May 23, 1928  2 Sheets-Sheet 1
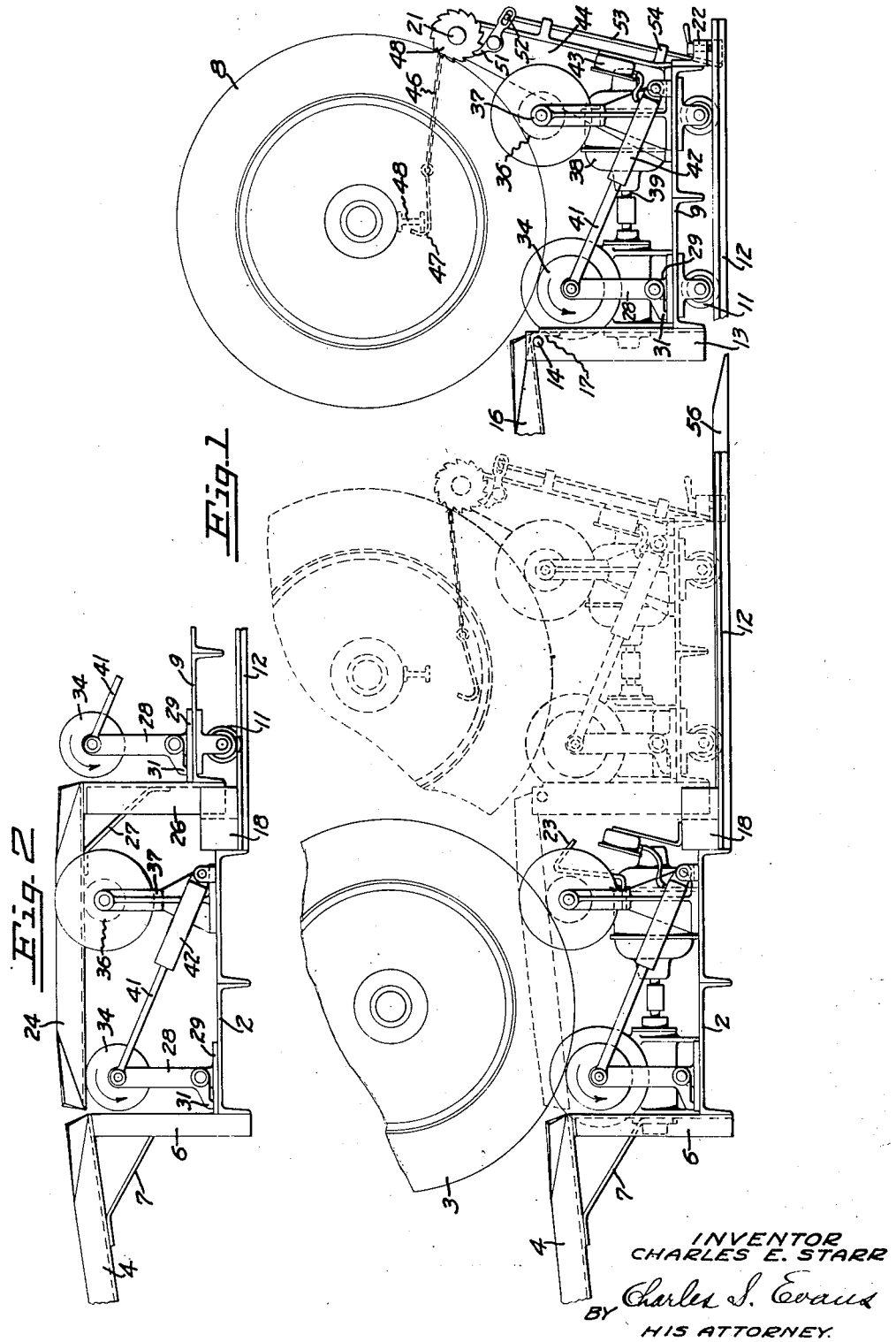
INVENTOR
CHARLES E. STARR
BY Charles S. Evans
HIS ATTORNEY.

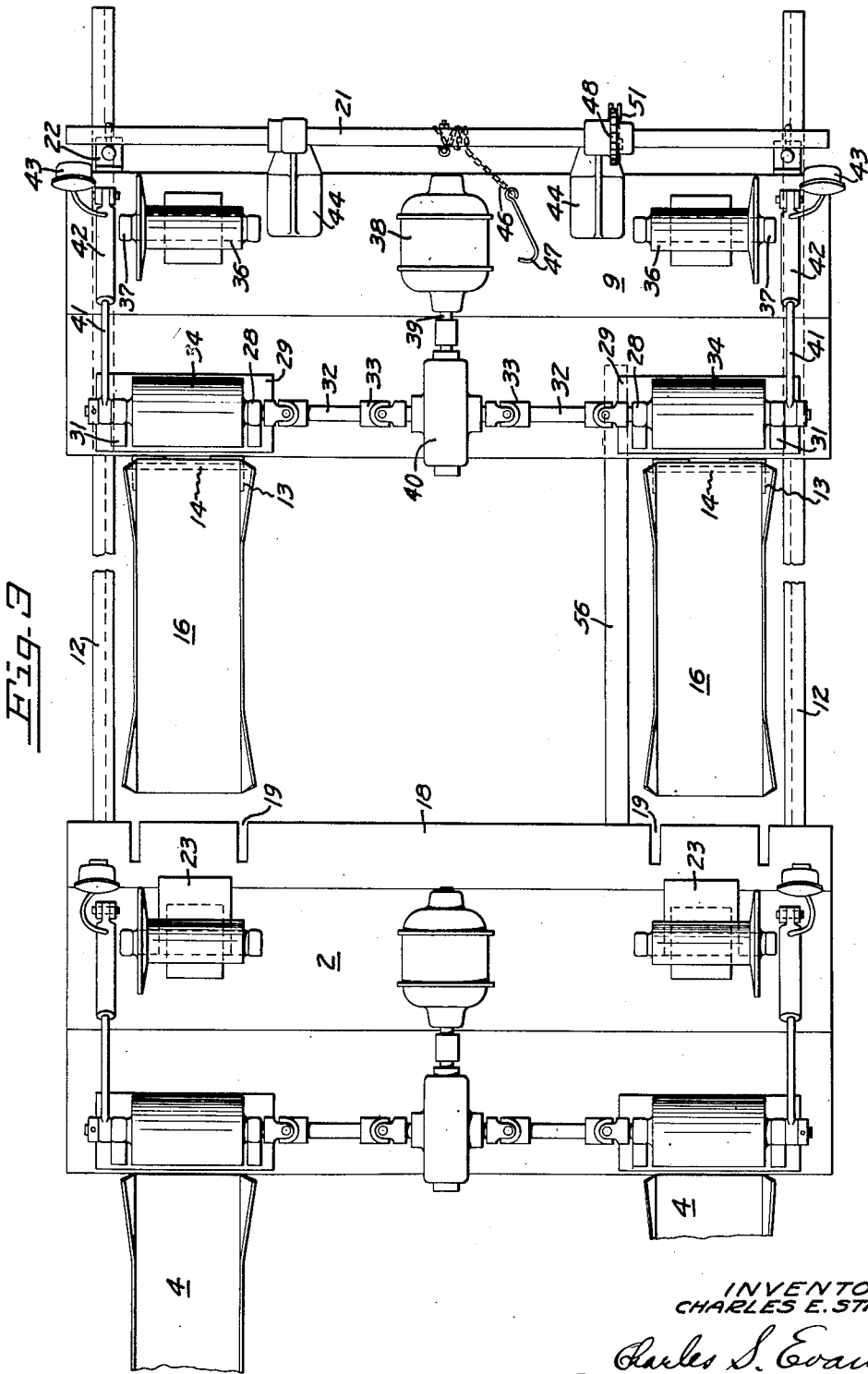

Patented July 11, 1933

1,918,063

UNITED STATES PATENT OFFICE

CHARLES E. STARR, OF WHITTIER, CALIFORNIA, ASSIGNOR TO BENDIX AVIATION CORPORATION, OF SOUTH BEND, INDIANA, A CORPORATION OF DELAWARE

VEHICLE TESTING APPARATUS

Application filed May 23, 1928. Serial No. 279,904.

My invention relates to testing apparatus for vehicles and more particularly to apparatus especially adapted to test the brakes of an automobile and the like and is a continuation in part of my copending application Serial No. 211,966, filed August 10, 1927.

In my prior application I have shown a brake testing machine having a bodily movable member arranged to support and to rotate a vehicle against resistance so that the movement of the member is a function of the weight thereon and of the force necessary to turn the wheel against resistance. Means are also provided for evaluating movements of the support to indicate the effect of the brake upon the wheel. The testing machine therein shown is constructed to support and test both front and rear wheels of a vehicle, the front wheels being mounted upon a movable carriage to accommodate the apparatus to the different wheel base lengths of various vehicles.

It is a purpose of my present invention to provide an apparatus of the character described, involving means for supporting both front and rear wheels of an automobile and to provide means which will permit one set of wheels to pass over one set of supports and onto the other supports.

It is also an object of my present invention to provide means in an apparatus of the character described for holding the vehicle while being tested and for automatically releasing the vehicle at the completion of the test.

Other objects and valuable features will be apparent from the following description of my invention.

My present invention is generally of the same type and construction of the testing mechanism disclosed in my prior application, heretofore referred to, but involves improvements in the movable carriage construction, and also includes means for holding the vehicle on the supports during the testing operation and means for automatically releasing the holding means. In accordance with my present invention the testing apparatus comprises a stationary supporting means for the rear wheels of the vehicle and a carriage movable toward and from that stationary supporting means for supporting the front wheels, the movable carriage having runways thereon adapted to extend over the rear supporting means, thus permitting the front wheels to be driven over the rear wheel supporting means and onto the movable carriage where it rests on the front wheel supports. With the front wheels thus in place further movement of the vehicle will cause the carriage to travel away from the stationary support in accordance with the wheel base of the vehicle being tested and permit the rear wheels to assume their position on the stationary supporting means. Inasmuch as the testing mechanism employed tends to move the vehicle off the apparatus, means are provided for holding the vehicle in testing position in conjunction with means for automatically releasing the holding devices at the completion of the test.

A more complete description will be given in connection with the drawings, in which:

Fig. 1 is a side elevation of the apparatus of my invention in which is shown a movable carriage for accommodating the apparatus to various wheel base lengths of vehicles. The carriage is shown in two positions, and a portion of the view is omitted to shorten the length of the Figure.

Fig. 2 is a side elevation showing a modified carriage construction. Portions of the figure are omitted to shorten the view.

Fig. 3 is a plan view of the apparatus of Fig. 1. The movable carriage is shown only in one position to more clearly disclose the construction.

In detail the illustrated embodiment of my invention comprises a fixed base 2 upon which is positioned the brake testing machine for one set or the rear wheels of the vehicle. The testing machine comprising generally two pairs of spaced rollers arranged with their axes parallel to each other and parallel to the axle of the vehicle. The pairs of rollers constitute a support for the rear wheels 3 of the vehicle for supporting the wheels in testing position. The front rollers of each pair are elevated above the rear rollers to prevent over-riding of the rear wheels as they are run onto the support. In order to guide the wheels to the rollers two uprights 6 are secured to each side of the rear end of the base and are braced by braces 7, to support two inclined runways 4, one for each pair of rollers. These runways constitute ramps leading from the ground to the rollers and over which the vehicle may be run. The details of construction of the testing devices will be described hereafter in greater detail.

In order to support and test the front wheels simultaneously with the rear wheels and to accommodate the testing machine to vehicles of different wheel bases, the base 2 is provided with a pair of parallel tracks 12 extending from each front corner of the base and upon which a movable carriage 9 mounted on wheels 11 may travel. Fixed to the carriage is a testing machine for the front wheels of the vehicle, the testing mechanism being similar to that on the stationary platform, and the rollers on the carriage being in alignment with those on the stationary platform or base. Secured vertically to the end of the carriage adjacent the base are two pairs of angle irons 13 having shafts 14 extending across the upper ends of each pair thereof. Shafts 14 serve as pivotal supports for two runways 16 arranged to project substantially horizontally and rearwardly toward base 2. Runways 16 are held in horizontal position and prevented from downward movement by means of stops 17 preferably formed as extensions of the bottoms of the runways bent to abut the backs of the angle irons 13.

In the initial position of the apparatus with the carriage adjacent base 2 runways 16 are adapted to rest on and span the rear rollers, with the carriage abutting the wood bumper block 18 having notches 19 for accommodating the sides of angle irons 13. When an automobile is driven up the inclines 4, the front wheels 8 will pass over the runways 16 and ride onto the rest between the rollers on the carriage. For preventing over-riding of the carriage by the vehicle, a safety bumper 21 is mounted on the carriage in front of its rollers. Upon further movement of the vehicle, the carriage will travel forward with the rear wheels 3 moving to their rollers, and when the rear wheels rest between the rear rollers, the vehicle is stopped. After this, the carriage is fixed to the rails by means of any suitable mechanism such as clamp 22 mounted thereon, and the test is then made.

When the vehicle is driven off the apparatus, a reversal of the above operation takes place, and guides 23 fixed to roller supports adjacent the carriage, direct the runways 16 onto the base rollers, while bumper block 18 acts as shock absorbing means when the carriage strikes the base.

A modified carriage construction is shown in Fig. 2, in which the use of guides 23 is obviated. In this modification the rear rollers are mounted at the same horizontal level. Consequently the carriage runways 24 can be horizontally positioned to rest on the rollers; therefore, the runways are fixed to angle irons 26 and the construction is strengthened by braces 27 attached to the runways and angles.

The specific testing machine for the base and for the carriage is the same. Therefore reference only is made in detail to the testing mechanism on the carriage. Furthermore, inasmuch as the construction of the supporting and testing mechanism for each wheel on the carriage or base is identical, the mechanism adapted to support and test one wheel only will be described.

The carriage 9 is formed or has secured rigidly thereto at each side thereof bearing plates 29 to each of which are pivotally secured at their lower ends a pair of support arms 28. Pivotal movement of the supports 28 is limited in one direction by means of stops 31 projecting from the arms 28 and contacting with bearing plates 29. A short shaft extends between the upper ends of the arms and is journalled therein to which shaft is keyed a roller 34. A second roller 36, journalled in fixed supports 37 in a position toward which supports 28 can move, is mounted a sufficient distance in front of each of rollers 34 to support a wheel therebetween.

Means are provided for driving rollers 34 comprising a flexible shaft 32 having universal joints 33 at each end thereof, as shown in Fig. 3, operatively connected to the roller shaft through said universal joints and to a driving motor 38 mounted on the carriage through a drive shaft 39 and any conventional gear reduction system 40.

It is preferred to provide a reduction; so that the wheels of the vehicle can be rotated at about 8 to 10 R. P. M. The direction of rotation of the rollers, as indicated by the arrow in Fig. 1, is opposite to that in which the supports 28 can move from a position of rest. Since the shaft 32 is flexible, it is evident that it can be driven while the supports turn.

Means are provided for yieldingly resisting movement of the pivoted supports and for evaluating the force of movement. Connected to the support is a piston 41 adapted to slide within the oil filled cylinder 42 pivotally mounted on the carriage. Joined to the cylinder is a pressure gauge 43 for indicating the pressure developed upon movement of the support.

The testing machine described is for testing the brakes of a wheeled vehicle, and when the vehicle is positioned on the apparatus, with its wheels resting between the rollers, the motors are started to turn the wheels. As long as the brakes are not applied, wheels 3 and 8 will turn freely. Upon application of the brakes, resistance to the rotation of the wheels is offered, and the resultant force will cause a bodily movement of the supports 28 thereby lifting the vehicle. The gauges will thus indicate a quantity which is a function of the weight on the rollers and the force for turning the wheels under resistance. From the various gauge readings, the degree of adjustment necessary for proper brake effect can be determined.

During the testing operation, the driven rollers tend to move the vehicle off the apparatus; therefore, means are provided for holding the vehicle on the apparatus and means are also provided for automatically releasing the holding means. Fixed to the bumper shaft 21 which is journaled in the bearing supports 44 on the carriage, is an anchoring means such as a chain 46 having a hook 47 secured to one end thereof which can be attached to the underside of the front axle 48, the other end of the chain being secured to shaft 21. The hook is constructed to partially encircle the axle; so that it will remain in position only when the chain is put under tension by rotating shaft 21, with any suitable means.

Before the test is made, the hook is manually held on the axle and the chain is placed under tension by turning the shaft 21. A ratchet mechanism comprising the ratchet wheel 48 fixed to the shaft and engaging the pawl 51 pivoted to one of the supports 44, is provided for locking the shaft in selective rotated position and thus holding the chain in tension. The free end of the pawl is forked and the forks are slotted to engage pins 52 of a trip rod 53 adapted to slide in the guideways 54 on the support. Due to the weight of the trip rod, the pawl is held to normally engage the ratchet, thus permitting rotation of the bumper shaft only in a direction to tighten the chain. Since the testing machine tends to move the vehicle in an opposite direction, the chain will oppose this motion and consequently hold the vehicle in position.

After completion of the test, the movable carriage backs up when the vehicle is driven off the apparatus, and for releasing the holding means, a cam-track 56 is secured to base 2 and extending forwardly between tracks 12 in position to be engaged by the lower end of rod 53 as carriage 9 moves rearwardly. When this occurs the trip rod moves upwardly to disengage the pawl; so as to permit loosening of the chain. Consequently the hook and chain will drop free from the axle upon the release of tension, and the vehicle can be driven off the apparatus.

Although I have described my apparatus in combination with a brake testing machine which evaluates both the force necessary to turn a braked wheel and the weight on the wheel, the apparatus can be used with any brake testing machine employing rotatable rollers to turn the braked wheels. It can also be employed in combination with other testing mechanisms such as power testing devices.

If the apparatus is installed in a pit, the construction of the movable carriage is the same, but the runways 4 for the fixed base can be dispensed with, since the rear rollers are mounted at the floor level.

In the specification and claims, the vehicle wheels are referred to as front and rear wheels and the rollers as front and rear rollers. However, these terms are merely for the purpose of obtaining clarity, it being understood that in the event of front wheel drive for vehicles, the wheels resting on the movable carriage are designated as the front wheels and their rollers, the front rollers.

I claim:

1. In a vehicle testing apparatus, supporting means for one of the rear wheels, a carriage for supporting one of the front wheels, said carriage being movable toward and from the rear wheel support and with the vehicle when the rear wheels move to their supporting means, and means for spanning the rear wheel supporting means to permit the front wheel to pass thereover.

2. In a vehicle testing apparatus, supporting means for one of the rear wheels, a carriage for supporting one of the front wheels, said carriage being movable toward and from the rear wheel support and with the vehicle when the rear wheels move to their supporting means, and means movable with the carriage for spanning the rear wheel supporting means when the carriage is adjacent said rear wheel support to permit the front wheels to pass thereover.

3. In a vehicle testing apparatus, a base having a pair of rollers for supporting one of the rear wheels, a carriage having a pair of rollers for supporting one of the front wheels, said carriage being movable toward and from said base and with the vehicle when the rear wheel moves toward or from said base with the front wheel on said carriage, means movable with the carriage for spanning the base rollers when the carriage is adjacent said base, said means comprising a runway pivotally secured to said carriage and extending rearwardly in a substantially horizontal plane over said base rollers.

4. In a vehicle testing apparatus, a base having a pair of rollers for supporting one of the rear wheels, a carriage having a pair of rollers for supporting one of the front wheels, said carriage being movable toward and from said base and with the vehicle when the rear wheel moves toward or from said base with the front wheel on said carriage, means movable with the carriage for spanning the base rollers when the carriage is adjacent said base, said means comprising a pair of uprights secured to said carriage and a runway pivotally secured to said uprights and extending substantially horizontally rearwardly over said base rollers.

5. In a vehicle testing apparatus, a base having a pair of rollers for supporting one of the rear wheels, a carriage having a pair of rollers for supporting one of the front wheels, said carriage being movable toward and from said base and with the vehicle when the rear wheel moves toward or from said base with the front wheel on said carriage, means movable with the carriage for spanning the base rollers when the carriage is adjacent said base, said latter means comprising a pair of uprights secured to said carriage, a runway pivotally secured to said uprights and extending substantially horizontally rearwardly over said base rollers, and means on said base for guiding said runways over said rollers when said carriage approaches said base.

6. In a vehicle testing apparatus, a base, a support on said base for the rear wheels of a vehicle to be tested, a carriage movable toward and from said base for supporting one of the front wheels of a vehicle, testing mechanism, the operation of which tends to move the vehicle off the apparatus, anchoring means on the carriage having portions thereof for attachment to a part of the vehicle, a rotatable member to which the anchoring means is fixed, a ratchet mechanism for controlling the rotatable member, a release for said ratchet mechanism engageable with a portion of said base upon movement of the carriage toward said base.

7. In a vehicle testing apparatus, a base, a support on said base for supporting the rear wheels of a vehicle to be tested, a carriage movable toward and from said base for supporting one of the front wheels of a vehicle, testing mechanism the operation of which tends to move the vehicle off said supports, anchoring means on the carriage having a portion thereof for attachment to a part of the vehicle, a rotatably mounted bumper for preventing overriding of the carriage by the vehicle, said anchoring means being secured to said bumper, a ratchet mechanism for controlling rotation of the bumper and a release for said ratchet mechanism engageable with a portion of said base upon movement of the carriage toward said base.

In testimony whereof, I have hereunto set my hand.

CHARLES E. STARR.